United States Patent [19]
McCaig et al.

[11] Patent Number: 5,156,365
[45] Date of Patent: Oct. 20, 1992

[54] TABLE-MOUNTABLE SUPPORT FOR A MANNEQUIN-HEAD

[76] Inventors: M. Lyle McCaig; D. Scott McCaig, both of 835 S. 112th Plaza, Omaha, Nebr. 68154

[21] Appl. No.: 822,872

[22] Filed: Jan. 21, 1992

[51] Int. Cl.⁵ .................................... F16M 13/00
[52] U.S. Cl. .................... 248/160; 248/231.7
[58] Field of Search ............... 248/160, 231.7, 229, 248/231.8, 104, 274; 223/66

[56] References Cited

U.S. PATENT DOCUMENTS

| | | | |
|---|---|---|---|
| 1,511,167 | 10/1924 | Jesnig | 248/160 X |
| 2,111,368 | 3/1938 | Kron | 248/160 |
| 2,186,403 | 1/1940 | Bullis | 248/160 X |
| 2,444,800 | 7/1948 | Aab | 248/51 |
| 3,424,419 | 1/1969 | Siegel | 248/231.7 |
| 3,489,383 | 1/1970 | Anson | 248/231.7 |
| 3,586,281 | 6/1971 | Schumer | 248/231.7 |
| 3,934,804 | 1/1976 | Bruce | 223/66 |
| 4,842,174 | 6/1989 | Sheppard | 248/160 X |

Primary Examiner—J. Franklin Foss
Attorney, Agent, or Firm—George R. Nimmer

[57] ABSTRACT

Facilitating the professional work and education of cosmetologists, mannequin-heads having an upwardly-convergent lower-opening are thereat removably attached upon a table-mountable upright post. Herein disclosed is an improved table-mountable support wherein the upright post portion is advantageously provided by a pair of concentric metallic helical elements so that the upright post support is stably flexibly laterally skewable to facilitate work and/or student practice upon the post-supported mannequin-head. The upright post is reliably uprightly attachable to an underlying horizontal table through an intervening angular base preferably haveing a vertical clamping screw that is postioned laterally away from the laterally skewable upright post.

6 Claims, 1 Drawing Sheet

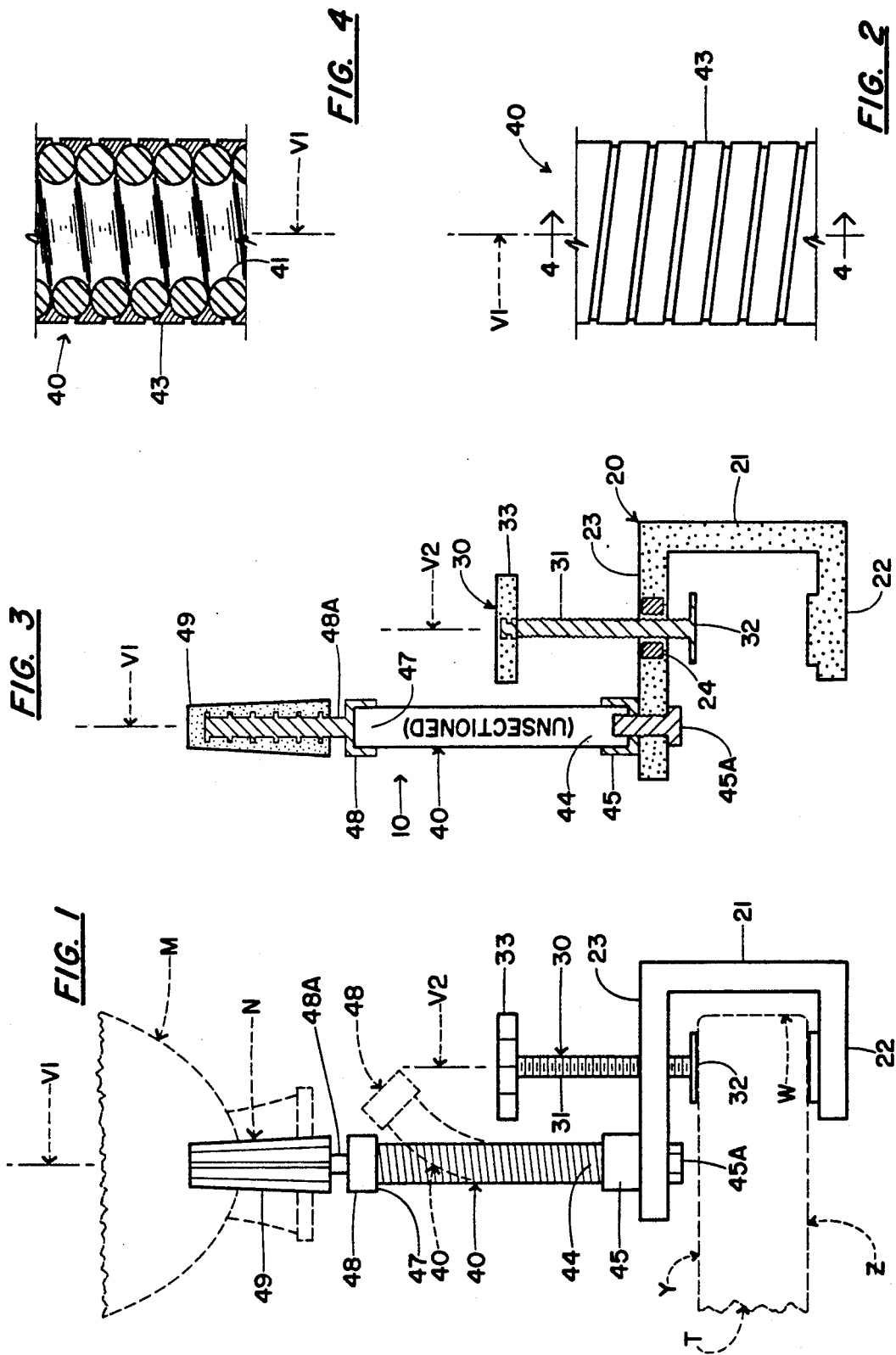

TABLE-MOUNTABLE SUPPORT FOR A MANNEQUIN-HEAD

RELATED "DISCLOSURE DOCUMENT"

It is requested that the related McCaig "Disclosure Document" number 250,271 (filed Apr. 10, 1990) be made "of record" herein.

BACKGROUND OF THE INVENTION

In the cosmetology arts, mannequin-heads (at an upwardly-convergent lower-opening portion thereof) are frictionally engaged to the upper portion of an upright post, the upright post lower portion being removably attached to an underlying horizontal table. Accordingly, professional cosmetologists can work upon wigs carried by the uprightly supported mannequin-head, and cosmetology students can practice upon wigged or haired mannequin-heads. However, uprightly supported mannequin-heads of the prior art are deficient, namely: prior art upright supporting posts are not stably flexibly laterally skewable, whereby the prior art fails to facilitate work and/or practice upon the post-supported mannequin-head; and the upright post is not reliably removably attachable to an underlying horizontal table.

OBJECTIVE OF THE INVENTION

It is accordingly the general objective of the present invention to provide an improved table-mountable support for a mannequin-head: wherein the upright post is enabled to reliably frictionally engaged the upwardly-convergent lower-opening of a mannequin-head; wherein the upright post along the upright length thereof is stably flexibly laterally skewable; and wherein the upright post lower portion is reliably securely removably attachable along the upright-end area of an underlying horizontal table.

GENERAL STATEMENT OF THE INVENTION

With the general objectives in view, and together with other ancillary and specific objectives which will become more apparent as this description proceeds, the table-mountable support for a mannequin-head of the present invention generally comprises:

an angular base adapted to embrace an upright-end area portion of a horizontal table and including: an upright-shoulder adapted to lie alongside a table upright-end; a lower-flange extending horizontally from said upright-shoulder and adapted to underlie said horizontal table; and an upper-flange extending horizontally from said upright-shoulder (above said lower-flange) and adapted to overlie said horizontal table;

attached to and extending uprightly from said angular base upper-flange and along a vertical primary-axis, an upright post that is stably flexibly skewable in directionally horizontal lateral directions from said primary-axis, said upright post comprising a metallic helical spring surrounding said primary-axis and a metallic helical girdle tightly surrounding said helical spring, and said upright post including a lower-end located adjacent said upper-flange and an upper-end;

loftily attached to said upright post, an upwardly convergent tapered-member whereby a mannequin-head having an upwardly convergent lower-opening might be stably removably frictionally engaged thereat by said topical tapered-member; and table-clamping means for rigidly removably clamping said angular base along the upright-end area of a horizontal table, and preferably including a vertical screw located parallel to and laterally offset from said primary-axis, namely along a vertical secondary-axis, said vertical screw being threadedly engaged with said angular base upper-flange and bearable upon said horizontal table.

BRIEF DESCRIPTION OF THE DRAWING

In the drawing, wherein like characters refer to like parts in the several views, and in which:

FIG. 1 is a side elevational view of a representative (but non-limiting) embodiment "10" of the "Table-Mountable Support for Mannequin-Head" of the present invention;

FIG. 2 is a detail view of the FIG. 1 side elevational view at the central upright post portion thereof;

FIG. 3 is a side elevational sectional view of the FIG. 1 representative embodiment "10", but wherein the upright post member central portion "40" is "unsectioned"; and FIG. 4 is a sectional elevational view taken along line 4—4 of FIG. 2.

DETAILED DESCRIPTION OF THE DRAWING

Representative embodiment "10" of the "Table-Mountable Support for Mannequin-Head" of the present invention, for the environment thereof, comprises: a prior art mannequin-head "M" having an upwardly convergent lower-opening "N", and an underlying table "T" having an upright-end "W", a horizontal upper-surface "Y", and a horizontal lower-surface "Z".

The table-mountable support representative embodiment 10 generally comprises:

(A) an angular base (20) adapted to embrace the upright-end portion "W" of a horizontal table "T" and including: an upright shoulder 21 adapted to lie alongside table upright-end "W"; a lower-flange 22 extending integrally horizontally from upright-shoulder 21 and adapted to underlie ("Z") said horizontal table "T"; and an upper-flange 23 extending integrally horizontally from said upright-shoulder (above said lower-flange 22) and adapted to overlie ("Y") said horizontal table "T";

(B) a table-clamping means (30) for rigidly removably clamping said angular base (20) along the upright-end area portion ("W") of a horizontal table "T";

(C) attached to (45A) and extending uprightly from the angular base upper-flange (23) along a vertical primary-axis "V1", an upright post (40) that is stably skewable (as alluded to in FIG. 1 phantom lines) in a plurality of directionally horizontal lateral directions from said primary-axis "V1", and said post (40) including a lower-end portion (44) located adjacent said angular base upper-flange 23 and an upper-end portion (47) loftily overlying said angular base upper-flange 23; and (D) loftily attached (48A) to said upright post (40), an upwardly convergent tapered-member 49 that surrounds said vertical primary-axis "V1", and thereby stably removably frictionally engageable within said upwardly convergent lower-opening portion "N" of a said mannequin-head "M".

In further reference to the table-clamping means (30) referred to hereabove, such might comprise a vertical-screw 31 extending along a vertical secondary-axis "V2" that is horizontally laterally offset from said vertical primary-axis "V1". Such located vertical-screw 31 is threadedly engaged (24) with the angular base upper-flange 23, and includes an enlarged bottom-end 32 that is (upon twisting of its enlarged top-end 33) bearable upon horizontal table upper-surface "Y" to rigidly clamp angular base portion 20 along upright-end portion "W" of a horizontal table "T". However, an alternate table-clamping means might be similarly employed at the upright post lower-end (44).

In further reference to the upright and laterally skewable post (40) referred to hereabove, same preferably comprises a metallic helical spring 41 surrounding said vertical primary-axis "V1" and which helical spring 41 is tightly surrounded by a metallic helical girdle 43. Upright post lower-end portion 44 might be crimpably attachably surrounded by a lower-collar 45 that is attached (45A) to angular base upper-flange 23. Analagously, upright post upper-end portion 47 might be crimpably attachably surrounded by an upper-collar 48 that is attached (48A) to a said upwardly convergent tapered-member 49.

Accordingly, it will be seen hereabove that there is provided a table-mountable support for a mannequin-head appropriate for educationable purposes, to fulfill the invention objectives recited hereabove.

From the foregoing, the construction and operation of the table-mountable support for a mannequin-head for for the hereabove mentioned cosmetology purposes will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

What is claimed is as follows:

1. For usage by cosmetology teachers, students, and practitioners, a table-mounted support for a mannequin-head having an upwardly-convergent lower-opening, said table mountable support comprising:

(A) an angular base adapted to embrace the upright-end portion of a horizontal table and including: an upright-shoulder adapted to lie alongside a table upright-end; a lower-flange extending horizontally from said upright-shoulder and adapted to underlie said horizontal table; and an upper-flange extending horizontally from said upright-shoulder, above said lower-flange, and adapted to overlie the said horizontal table;

(B) table-clamping means for rigidly clamping said angular base along the upright-end area of a said horizontal table;

(C) attached to and extending uprightly from said angular base upper-flange and along a vertical-axis, an upright post that is stably flexibly skewable in a plurality of selectable, directionally horizontal lateral directions from said vertical-axis, said post including a lower-end located adjacent said upper-flange and an upper-end loftily overlying said upper-flange, and said upright post comprising a metallic helical spring surrounding said vertical-axis and said metallic helical spring being tightly surrounded by a metallic helical girdle; and (D) loftily attached to said upright post, an upwardly convergent tapered-member that surrounds said vertical-axis and extends above the upper-end thereof, whereby a mannequin-head having a said upwardly convergent lower-opening might be securely removably frictionally engaged with said upwardly extending tapered member.

2. The table-mountable support of claim 1 wherein said tapered-member includes an underlying upper-collar portion that crimpably attachably surrounds the upright post upper-end portion.

3. The table-mountable support of claim 1 wherein said upright post lower-end portion is crimpably attached by a lower-collar port on to the said angular base upper-flange.

4. The table-mountable support of claim 3 wherein said tapered-member includes an underlying upper-collar portion that crimpably attachably surrounds the upright post upper-end portion.

5. The table-mountable support of claim 4 wherein said table-clamping means comprises a vertical screw located parallel to and laterally offset from said vertical-axis, said screw being threadedly engaged with said base upper-flange and bearable upon the horizontal table.

6. The table-mountable support of claim 1 wherein said table-clamping means comprises a vertical screw located parallel to and laterally offset from said vertical-axis, said screw being threadedly engaged with said angular base upper-flange and bearable upon the said horizontal table.

* * * * *